Patented July 20, 1943

2,324,848

UNITED STATES PATENT OFFICE 2,324,848

PROCESS OF PREPARING ANTIANEMIC CONCENTRATES

Havard L. Keil, Clarendon Hills, Ill., assignor to Armour and Company, Chicago, Ill., a corporation of Illinois No Drawing. Application May 21, 1941, Serial No. 394,561

10 Claims. (Cl. 167—74)

This invention relates to processes of isolating anti-anemic principles from animal tissue containing the same.

In the past, anti-anemic principles have been recovered from animal tissue, such as livers and stomaches, by mincing the glandular tissue and mixing with water to give an aqueous extract containing the anti-anemic principles. In the usual practice, this aqueous extract has then been concentrated to a paste and the paste thereafter mixed with large volumes of ethyl alcohol. The supernatant alcoholic liquid is siphoned off from insoluble substances settling out and the alcoholic liquid concentrated in vacuo. The anti-anemic principles in the concentrate thus obtained are then precipitated by the addition of large volumes of absolute or 95% ethyl alcohol.

This stated method is in general use for the recovery of anti-anemic principles from animal glandular material but it has the disadvantage that very large quantities of absolute or 95% ethyl alcohol are necessary and the alcohol must be recovered if the process is to be made economical.

I have now discovered less expensive ways of recovering anti-anemic principles from animal tissue material and ways which avoid the use of large volumes of liquids. My invention is based upon the discovery that the anti-anemic principles in animal tissue are soluble in strong methyl alcohol solutions. Whereas the anti-anemic principle becomes progressively insoluble in aqueous ethyl alcohol mixtures when the alcohol therein is increased to amounts greater than 70%, I have discovered that the anti-anemic principles are easily soluble in aqueous methyl alcohol solutions, the alcoholic concentration of which ranges from 75% to 100%. As a result of this difference in behavior between methyl and ethyl alcohol I have been able to markedly simplify and lessen the cost of recovering antianemic principles from animal tissue.

In the practice of my process I first prepare an aqueous extract of the animal tissue, as usual in the art, and concentrate this paste until its water content is about 18% to 25%, although these percentages are not critical. The tissue used can be livers, stomachs, and other tissue material hitherto used. I then add enough methyl alcohol, which can be absolute methyl, the ordinary 95% methanol of commerce, or methyl alcohol having a strength greater than 75%, until the aqueous alcohol in the concentrated paste, having a regard for the water originally present therein, has a composition such that the alcohol thereof is at least 75%. Thereafter the mixture is filtered and the alcoholic extract further purified as I shall describe, or directly concentrated to give a dry antianemic material. Thus I distinguish from the prior art by using aqueous methyl alcohol mixtures in the paste wherein the methyl alcohol has a concentration of at least 75% and under these conditions the anti-anemic principle dissolves in the aqueous methyl alcohol. Were ethyl alcohol used in place of methyl alcohol the anti-anemic principle would not be completely soluble at 75% and would be completely insoluble at 95%, thus the principle would be associated with the other portions of the animal tissue which are soluble neither in aqueous ethyl alcohol nor in aqueous methyl alcohol.

More specifically, the ground animal tissue, usually hog livers, is mixed with about an equal quantity of water. The water solution advantageously contains about 3 cubic centimeters of hydrochloric acid for each pound of liver starting material. The purpose of the acid is to increase the hydrogen ion concentration to the isoelectric point of the proteins present. Other acids can, of course, be used to effect this hydrogen ion concentration. The aqueous mixture is then heated to a temperature of about 80° C. for a period of about five minutes in order to granulate or coagulate proteins which are present. Then the mixture is filtered through cloth filter bags, as usual in the art, and the filtrate concentrated to a paste having a moisture content of about 18% to 25%. Concentration is performed under vacuum, as in the usual methods. The moisture content can vary over rather wide limits. The temperature stated above should be about 70° C. to 80° C. simply because at this temperature protein coagulation occurs rapidly.

Having obtained a concentrated aqueous paste in the above manner, I then add to it sufficient methyl alcohol until the methyl alcohol and the water in the paste give an alcohol-water mixture in which the alcohol has a strength of at least 75%. Ninety-five percent strength aqueous methyl alcohol can be used or I can add absolute methyl alcohol. Absolute methyl alcohol is readily obtained commercially. Any aqueous methyl alcohol can be used provided it is stronger than 75% so that the added alcohol, water therein, and water in the paste, give an aqueous methyl alcohol solution containing at least 75% methyl alcohol.

The actual amount of methyl alcohol to be added will, of course, depend upon the strength of the added methyl alcohol and the amount of moisture in the paste. For example, 100 parts by volume of paste containing 20% of moisture will, if admixed with 200 parts by volume of absolute methyl alcohol, give a mixture in which the water-alcohol solution has a concentration of 90.9% methyl alcohol. If the paste contains 18% of moisture, and like quantities of paste and alcohol are used, then the final methyl alcohol concentration in the aqueous methyl alcohol will be 91.7%. If one part by volume of absolute methyl alcohol is added to one part by volume of paste containing 20% of moisture, then the final methyl alcohol concentration in the aqueous methyl alcohol of the paste will be 83.3%. These quantities and concentrations are merely illustrative and are not limiting.

The resulting mixture is advantageously allowed to stand overnight at a temperature of about —5° C. to —10° C. in order to permit insoluble impurities to settle out. The anti-anemic principle is soluble in aqueous methyl alcohol having a methyl alcohol concentration of 75% or more at any temperature higher than —20° C. By maintaining the mixture, after the addition of alcohol, at a low temperature, for example, —5° C. to —10° C., many of the impurities remain insoluble without, however, affecting the solubility of the anti-anemic principle itself. Thus by the addition of cold methyl alcohol to the concentrated aqueous paste, or by chilling the mixture after the addition of the methyl alcohol, or by both expedients, a more highly purified anti-anemic principle can be ultimately obtained. But I do not wish to be restricted to the use of cold methyl alcohol or to the chilling operation.

After the addition of the alcohol and allowing the mixture to stand in order to insure solution of the anti-anemic principle, the mixture is then filtered from substances remaining insoluble. The filtrate is an aqueous alcohol solution containing at least 75% by volume of methyl alcohol in the aqueous alcohol portion. That filtrate can be chilled to a temperature of —5° C. or —10° C. for the precipitation of any substances insoluble at this temperature. If it is chilled and a precipitate results then the cold extract is filtered.

Finally, the aqueous methyl alcohol extract containing the anti-anemic principle is then concentrated in vacuo for the recovery of a dry product. This dry product can be capsuled or handled in other ways common in this art.

This application is a continuation in part of my copending application Serial Number 236,113, filed October 20, 1938.

Having thus described my invention, what I claim is:

1. The process of recovering anti-anemic principles from animal tissue containing the same which comprises admixing an aqueous paste of the anti-anemic principle with methyl alcohol until the aqueous methyl alcohol portion of the resulting mixture has a concentration such that the methyl alcohol therein is at least 75%, separating the aqueous methyl alcohol solution containing the anti-anemic principle from insolubles in the mixture and recovering the anti-anemic principle from the aqueous methyl alcohol solution.

2. The process of recovering anti-anemic principles from animal tissue containing the same which comprises admixing an aqueous paste of the anti-anemic principle with cold methyl alcohol until the aqueous methyl alcohol portion of the resulting mixture has a concentration such that the methyl alcohol therein is at least 75%, separating the aqueous methyl alcohol solution containing the anti-anemic principle from insolubles in the mixture and recovering the anti-anemic principle from the aqueous methyl alcohol solution.

3. The process of recovering anti-anemic principles from animal tissue containing the same which comprises admixing an aqueous paste of the anti-anemic principle with methyl alcohol having a temperature of about —5° C. to —10° C. unitl the aqueous methyl alcohol portion of the resulting mixture has a concentration such that the methyl alcohol therein is at least 75%, separating the aqueous methyl alcohol solution containing the anti-anemic principle from insolubles in the mixture and recovering the anti-anemic principle from the aqueous methyl alcohol solution.

4. The process of recovering anti-anemic principles from animal tissue containing the same which comprises admixing an aqueous paste of the anti-anemic principle with methyl alcohol until the aqueous methyl alcohol portion of the resulting mixture has a concentration such that the methyl alcohol therein is at least 75%, separating the aqueous methyl alcohol solution containing the anti-anemic principle from insolubles in the mixture, chilling the methyl alcohol solution to precipitate substances insoluble in cold aqueous methyl alcohol, separating precipitated substances therefrom, and recovering the anti-anemic principle from the aqueous methyl alcohol.

5. The process of recovering anti-anemic principles from animal tissue containing the same which comprises admixing an aqueous paste of the anti-anemic principle with methyl alcohol until the aqueous methyl alcohol portion of the resulting mixture has a concentration such that the methyl alcohol therein is at least 75%, chilling the mixture, separating the aqueous methyl alcohol solution containing the anti-anemic principle from insolubles in the mixture and recovering the anti-anemic principle from the aqueous methyl alcohol solution.

6. The process of recovering anti-anemic principles from animal tissue containing the same which comprises admixing an aqueous paste of the anti-anemic principle with methyl alcohol until the aqueous methyl alcohol portion of the resulting mixture has a concentration such that the methyl alcohol therein is at lease 75%, chilling the mixture to a temperature of —5° C. to —10° C., separating the aqueous methyl alcohol solution containing the anti-anemic principle from insolubles in the mixture and recovering the anti-anemic principle from the aqueous methyl alcohol solution.

7. The process as in claim 1 wherein the methyl alcohol admixed with the paste has a strength of 95% to 100%.

8. The process as in claim 3 wherein the methyl alcohol admixed with the paste has a strength of 95% to 100%.

9. The process as in claim 1 wherein the animal tissue is animal livers.

10. The process as in claim 3 wherein the animal tissue is animal livers.

HAVARD L. KEIL.